July 17, 1934.    C. J. YOUNG    1,967,072
RECORDING METHOD AND SYSTEM
Filed May 28, 1932
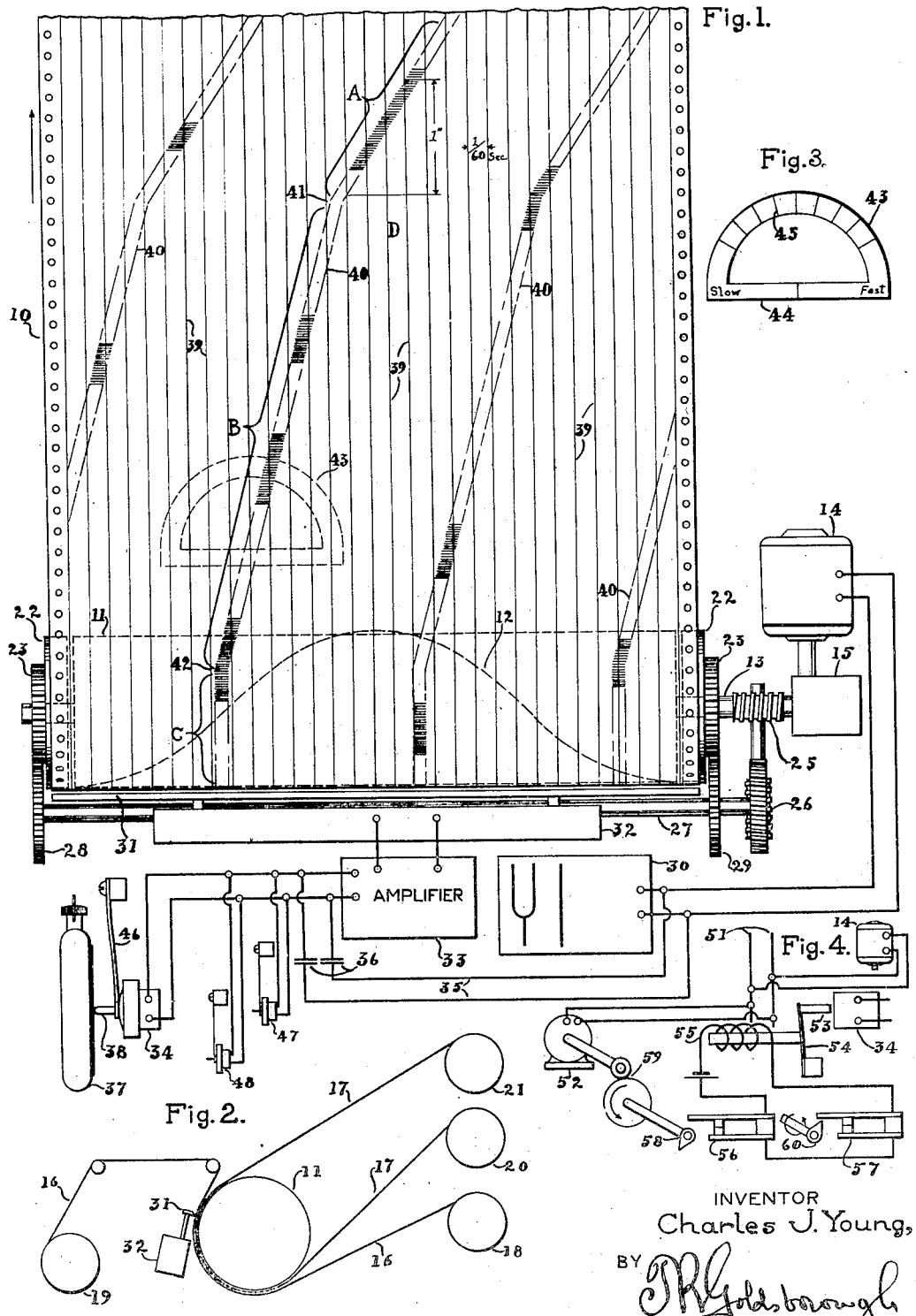
INVENTOR
Charles J. Young,
BY
HIS ATTORNEY Patented July 17, 1934

1,967,072

UNITED STATES PATENT OFFICE 1,967,072

RECORDING METHOD AND SYSTEM

Charles J. Young, Ardmore, Pa., assignor to Radio Corporation of America, a corporation of Delaware Application May 28, 1932, Serial No. 614,077

10 Claims. (Cl. 234—36.5)

My invention relates to improvements in recording methods and systems.

One of the objects of my invention is to provide an improved recording system for furnishing a continuous record of occurring variations in the rate of operation of many different kinds of devices and apparatus, such as watches, chronometers, electric motors and rotating shafts, or other moving machine parts, which have a definite normal period or rate of operation.

Another object of my invention is to provide an improved recording system which is capable of making a record to show a substantially lower percentage variation, from the normal rate of operation of a machine or machine part, than has been possible with the various recording systems proposed heretofore for this purpose.

Other objects and advantages will hereinafter appear.

For the purpose of illustrating my invention, an embodiment thereof is shown in the drawing, wherein Figure 1 is a plan view, partly diagrammatic, of a recording system constructed and operable in accordance with my invention;

Fig. 2 is an elevational view, looking toward the left of the system shown in Fig. 1;

Fig. 3 is a plan view of a part used in connection with my improved system; and

Fig. 4 is a simplified, diagrammatic view, showing the manner in which my improved system may be used for making a record of the operation of a plurality of electric motors.

In Fig. 1, the reference numeral 10 designates recording apparatus of the type commonly referred to as a carbon paper recorder, and which is particularly useful for the reception of pictures in a facsimile system. The details of construction and the manner of operation of the apparatus 10 are fully disclosed in my Patent #1,848,862 of March 8, 1932.

Briefly, the apparatus 10 comprises a rotatable drum 11 provided with a spiral ridge 12 and fixed on a shaft 13 which is driven by a synchronous motor 14 through a suitable reduction gear unit 15. It will be assumed that the drum is rotated in a counterclockwise direction, as viewed in Fig. 2. The ridge 12 extends the full length of the drum, and around the same once in a clockwise direction, as viewed in Fig. 2. A carbon sheet 16 and a record sheet 17 are superimposed on each other and are disposed about the drum 11, as more clearly shown in Fig. 2. The carbon sheet is taken from a roll 18 and, after passing through the apparatus, is wound on a drum 19. The record sheet 17 is taken from a drum 20, and, after passing through the apparatus, is wound on a drum 21.

The edges of both sheets 16 and 17 are similarly perforated, as shown in Fig. 1, to receive the teeth of suitable sprocket gears 22 which are mounted loosely on the shaft 13, and to which are affixed gears 23. The sheets 16 and 17 are fed slowly through the apparatus, at the rate of one inch every minute, for example, the power for this purpose being taken from the shaft 13 through the worm gear connections 25 and 26 which drive a counter shaft 27. Gears 28 and 29 are fixed on the shaft 27, and these mesh with the gears 23.

In the disclosed embodiment of my invention, the motor 14 is a 60 cycle synchronous motor supplied from a suitable 60 cycle frequency standard 30. The rate of rotation of the driving motor is, therefore, always constant, and the gear unit 15 is such that the drum 11 makes an integral number, say exactly two complete revolutions every second. The pressure of the sheets 16 and 17 on the spiral ridge 12 is sufficient to hold them against the same, but at the same time, to permit the ridge to slide or scrape over the under recording sheet 17 due to the relatively high peripheral speed of the ridge as compared with the relatively low rate of feed of the sheets.

A suitable printer bar 31 is disposed as shown in proximity to and in parallel relation to the surface of the drum 11, and is spring-biased away from the same. The bar 31 is driven by suitable electromagnetic means 32 to cause the bar to strike the sheets 16 and 17 on the ridge 12, thereby making a mark on the record sheet 17 from the carbon sheet 16.

The printer bar 31 and the drum 11, with its spiral ridge 12, comprise means for scanning the record sheet 17 along straight lines, the number of lines scanned per inch being determined by the rate of feed of the sheets 16 and 17 through the apparatus. In this connection, it will be understood that for every revolution of the drum the point of intersection of the operating edge of the printer bar and the ridge 12 travels once straight across the record sheet 17, and only from left to right. Since the sheet 17 is being fed slowly through the apparatus, as explained, and the drum 11 is rotating simultaneously at a relatively high rate, the entire area of the record sheet is scanned. However, no mark or record is made on the sheet 17 until the printer bar 31 is actuated by an electrical signal to cause it to strike the sheets, in which case the position of the mark is determined by the angular position of the ridge 12 at that instant, or in other words, the distance to the right of the point of intersection referred to.

An electrical power-supply circuit 33, in the form of a suitable amplifier, is connected, as shown, to the electromagnetic driving means 32, and a suitable microphonic device 34 is connected to the input of this circuit for the purpose of causing the latter to supply impulses to the driving means 32, each impulse effecting marking action of the bar 31.

A 60 cycle wave is taken from the standard 30 and applied to the input of the circuit 33 through connections 35 and condensers 36, the latter providing a loose capacitive coupling between the standard 30 and the circuit 33.

In the operation of my improved system for recording the ticks of watches, or indicating chronometer rate, a watch 37, for example, is supported in any suitable manner with the crystal or some part of the casing in firm contacting relation with a pin 38 or other suitable element for actuating the microphone. The microphone is fixed to the end of an arm 46 of spring steel or other suitable resilient material, the arm being flexed slightly when the watch is in position so that the spring action operates to hold the pin 38 in contacting engagement with the watch.

The microphone, through the mechanical connection 38, is sensitive to each tick of the watch, so that for each tick the microphone operates to cause the circuit 33 to supply an impulse to the electromagnetic means 32 to effect actuation of the printer bar 31. For each tick of the watch 37, therefore, a mark is made on the record sheet 17.

In operation, the 60 cycle wave, applied to the driving circuit 33 through the connections 35, causes the printer bar to be actuated at the rate of 60 times a second to make time markings on the record sheet 17. Since the drum 11 makes exactly two complete revolutions per second, these time markings appear as parallel lines 39 uniformly spaced and perpendicular to the axis of rotation of the drum. The space between adjacent lines represents a period time of 1/60 of a second, and is greater or less, depending upon the number of revolutions made each second by the drum. That is, the space between adjacent lines 39 will be doubled if the rate of rotation of the drum is doubled, and vice versa.

According to the character of the watch movement, the same will make four or five ticks a second, and these ticks will be recorded on the sheet 17 as lines 40.

In the case illustrated, the watch 37 was running fast, as indicated by the portion A of the line 40, and was corrected at the point 41. From the point 41, the watch was running more nearly correct to standard, but was still fast, as indicated by the portion B of the line 40. At the point 42, the watch was again corrected, after which it ran true to standard, as indicated by the portion C of the line 40. The reason the portions A and B of the line 40 slope in the direction shown when the watch is running fast is because the scanning point of intersection referred to above travels across the record sheet only from left to right and always at a constant rate. For the same reason, the line 40 slopes in the opposite direction when the watch is losing time, and is vertical, as shown by the portion C, when the watch is running true to standard. The time lines 39 are always vertical because the apparatus is always in synchronism with the 60 cycle standard 30.

The rate at which the watch is running fast or slow can be read directly from the record. For example, the rate of feed of the record sheet 17 is known, and this, for example, might be at the rate of one inch every minute. If this distance is laid off along one of the time lines, as shown in Fig. 1, and used as the altitude of the triangle whose base is the horizontal line D which spans four of the time spaces, each of which represents 1/60 of a second, it will be seen that at the outset, the watch 37 was gaining at the rate of 1/15 of a second every minute.

To facilitate the reading of the record, a device in the form of a protractor 43 may be used. This device is laid upon the record sheet 17 with its edge 44 perpendicular to the time lines 40, as indicated by the broken line showing in Fig. 1. The device is then shifted on the paper until one of the radial marks 45 lines up with the portion B, for example, of the line 40. With the device 43 suitably graduated, the rate which the watch is running fast or slow can be read directly from the device 43.

For the purpose of setting a number of watches at the same time, one or more additional microphones 47 and 48 can be connected as shown to the input of the circuit 33, and against which other watches are supported in the same manner as the watch 37 is supported with respect to the microphone 34.

Although the recorded lines 40 for the different watches will be simultaneously recorded or marked on the record sheet, an experienced operator will be able to distinguish between the same and to determine which of the watches are running fast or slow, and which are running true to standard. In actual practice, it will be understood that the apparatus need be run for only a few minutes to determine whether any of the watches are gaining or losing time. In this connection, if any watch is losing time, the recorded lines corresponding to the same will slope in the opposite direction to the lines 40, the degree of sloping being directly proportional to the rate at which this watch is losing time.

The precision of the system may be increased by increasing the number of complete revolutions per second of the drum 11. For example, if the drum is rotated through exactly four complete revolutions per second, the space between the adjacent time lines 39 will be twice that in Fig. 1, and will represent a time period of 1/60 of a second.

The manner in which my improved system may be used for providing a continuous and visible record of the operation of electrical motors is shown in Fig. 4. In this case, the synchronous motor 14 is supplied from the line 51 which also supplies a synchronous motor 52. Associated with the microphone 34 is a hammer 53 carried on the end of a spring arm 54 which is pulled back slightly, as shown, by the energized electromagnet 55. The exciting circuit for this magnet includes the normally closed, series-connected switches 56 and 57. A cam 58, driven from the motor 52 through the reduction gears 59, operates to open the switch 56 every fifth revolution, for example, of this motor. When the switch 56 is opened, the magnet 55 releases the hammer 53 which thereupon strikes the microphone 34 to produce a mark on the record sheet. In like manner, another motor (not shown), the rate of operation of which is to be compared with that of the motor 52, drives a cam 60 at approximately the same rate as the cam 58, and opens the switch 57 to make a mark on the record sheet every fifth revolution of this motor. By displacing the cams 58 and 60, as shown, the marked lines on the record sheet will be spaced apart and easily distinguishable. Other motors may also be included, in which case there will be additional switches connected in series with the switches 56 and 57, and associated cams similar to and driven at approximately the same rate as the cams 58 and 60.

From the foregoing, it will be seen that a continuous and visible record is obtained showing if one or more of a number of independently operating motors is running fast or slow with respect to a standard. This, it will be understood, is determined by parallelism or non-parallelism of the recorded lines which would correspond to the lines 40 in Fig. 1, and by the direction and degree of slope of one or more of the lines. This use of my improved system has particular utility in paper mills or the like wherein it is important that a plurality of motors or shafts be kept in synchronism within a very high percentage of accuracy.

In the above description it has been assumed that one of the motors is run at constant speed from a frequency standard and that the rate of the others is compared therewith. It is clear that the method is equally effective in comparing the relative rate of two devices, neither one of which need have a constant rate.

It will be understood that various other uses may be made of my improved system, and that many modifications, such as in the character and manner of arrangement of the operating or control parts, may be made without departing from the spirit of my invention or the scope of the claims.

I claim as my invention:

1. In a recording system of the character described, a record sheet, means for supporting said sheet, means for moving said sheet, means for scanning said sheet along lines substantially perpendicular to the direction of movement of said sheet, means for marking said sheet, said marking means forming part of said scanning means, an electrical power-supply circuit for said marking means, and a microphonic device for controlling said circuit.

2. In a recording system of the character described, a rotatable drum provided with a spiral ridge, a bar supported in parallel relation to the axis of rotation of said drum and in proximity thereto, said bar being biased away from said drum, a record member disposed about said drum, means for rotating said drum at a constant rate, means for imparting feeding movement to said member, means for driving said bar to cause the same to strike said member on said ridge, an electrical power supply circuit for said driving means, and a microphonic device for controlling said circuit.

3. In a recording system of the character described, a record sheet, means for scanning said sheet and operable to mark the same, means for driving said scanning means, and means for effecting marking action of said scanning means at a given frequency, the ratio between said given frequency and the rate of operation of said driving means being definite and fixed and such that in operation said scanning means marks said sheet along parallel and evenly spaced lines wherein the space between adjacent lines represents a definite time interval.

4. In a recording system of the character described, a record sheet, means for imparting feeding movement to said sheet, means for scanning said sheet along lines transverse to the direction of feed thereof, said scanning means being operable to mark said sheet, means for driving said scanning means, and means for effecting marking action of said scanning means at definite and spaced instants of time during each scanning-line period whereby a series of spaced and parallel lines are marked on said sheet.

5. In the art of recording the occurrence of certain conditions against time wherein a record is marked to represent time and wherein a member is actuated in accordance with the occurrence of said certain conditions and operates upon such actuation to mark said record, the step in the method of operation which consists in utilizing said member to put the time markings on said record.

6. In a recording system of the character described, a rotatable drum provided with a spiral ridge, a bar supported in parallel relation to the axis of rotation of said drum and in proximity thereto, said bar being biased away from said drum, a record member disposed about said drum, means for rotating said drum at a constant rate, means for imparting feeding movement to said member, means for driving said bar to cause the same to strike said member on said ridge, an electrical power-supply circuit for said driving means, a microphonic device for controlling said circuit, and means operable independently of said device to drive said bar uniformly at a constant rate which is an even multiple of the rate of rotation of said drum.

7. In the art of recording the occurrence of certain conditions against time wherein a record is marked to represent time and is marked in accordance with the occurrence of said certain conditions, the steps in the method of operation which consist in scanning said record, and making said time markings and the other markings simultaneously with the scanning of said record.

8. In a system for recording relatively small variations in the rate of rotation of a shaft from a standard rate, a record sheet, means for line-scanning said sheet, means for driving said first-named means at a rate having a fixed relation to said standard rate, means forming part of said line-scanning means and operable to mark said sheet, and means responsive to conditions of rate of rotation of said shaft and operable to effect marking action of said marking means in accordance with such conditions.

9. In a system for making a visible record indicative of the relation between the respective rates of rotation of a plurality of rotating shafts, a record sheet, means for scanning said sheet, said scanning means being operable upon actuation thereof to mark said sheet, and individual means responsive respectively to conditions of rate of rotation of said shafts and each operable to effect marking action of said scanning means for each definite number of complete rotations of the respective shaft, the rate of operation of said scanning means being such as to cause the successive markings for any particular shaft to appear on the record sheet as a line.

10. In a system for making a visible record indicative of the relation between the respective rates of rotation of a plurality of rotating shafts, a record sheet, and individual means responsive respectively to conditions of rate of rotation of said shafts and each operable to effect marking of the record sheet periodically and at a rate corresponding to the rate of rotation of the respective shaft, the periodic marks caused by said individual means appearing on the record sheet as lines whose angular relation with respect to each other varies proportionally to occurring variation in the relative rates of rotation of said shafts.

CHARLES J. YOUNG.